United States Patent
Huang et al.

(10) Patent No.: US 10,609,382 B2
(45) Date of Patent: Mar. 31, 2020

(54) METHOD AND APPARATUS FOR COMPRESSING VIDEO DATA

(71) Applicant: Montage LZ Technologies (Chengdu) Co., Ltd., Shuangliu District, Chengdu (CN)

(72) Inventors: Youyuan Huang, Shanghai (CN); Zhimin Qiu, Shanghai (CN)

(73) Assignee: MONTAGE LZ TECHNOLOGIES (CHENGDU) CO., LTD., Chengdu (CN)

(*) Notice: Subject to any disclaimer, the term of this patent is extended or adjusted under 35 U.S.C. 154(b) by 0 days.

(21) Appl. No.: 16/197,368

(22) Filed: Nov. 21, 2018

(65) Prior Publication Data
US 2019/0215519 A1 Jul. 11, 2019

(30) Foreign Application Priority Data
Jan. 5, 2018 (CN) .......................... 2018 1 0011673

(51) Int. Cl.
*H04N 19/152* (2014.01)
*H04N 19/172* (2014.01)
*H04N 19/124* (2014.01)
*H04N 19/426* (2014.01)

(52) U.S. Cl.
CPC ......... *H04N 19/152* (2014.11); *H04N 19/124* (2014.11); *H04N 19/172* (2014.11); *H04N 19/426* (2014.11)

(58) Field of Classification Search
None
See application file for complete search history.

(56) References Cited

U.S. PATENT DOCUMENTS

| | | | |
|---|---|---|---|
| 8,175,147 B1* | 5/2012 | Webb | H04N 19/197 348/497 |
| 2008/0193028 A1* | 8/2008 | Lan | H04N 19/593 382/244 |
| 2014/0205002 A1 | 7/2014 | Guo et al. | |
| 2016/0234496 A1 | 8/2016 | Panda et al. | |

* cited by examiner

*Primary Examiner* — Christopher G Findley
(74) *Attorney, Agent, or Firm* — Jun He Law Offices P.C.; James J. Zhu (57) ABSTRACT

A method for compressing video data, comprising: determining a compression target for a picture buffer; calculating a unit buffer budget for each compression unit based on the compression target, a size of the pixel array of the compression unit and a bit depth of pixels of the pixel array; receiving the video data; for a $k^{th}$ compression unit of each video picture of the video data: calculating a unit compression cost for the $k^{th}$ compression unit using a predetermined lossless compression algorithm and an accumulated compression cost, comparing the accumulated compression cost and an accumulated buffer budget for the $k^{th}$ compression unit, and selecting compressing the $k^{th}$ compression unit using the predetermined lossless compression algorithm or the predetermined lossy compression algorithm according to the comparison between accumulated compression cost and the accumulated buffer budget; and sending the compressed $k^{th}$ compression unit to the picture buffer.

27 Claims, 5 Drawing Sheets

METHOD AND APPARATUS FOR COMPRESSING VIDEO DATA

CROSS REFERENCE TO RELATED APPLICATIONS

This application claims priority to Chinese Patent Application Number 201810011673.5 filed on Jan. 5, 2018, the entire content of which is incorporated herein by reference.

TECHNICAL FIELD

The disclosure generally relates to video picture processing, and more particularly to a method and apparatus for compressing video data.

BACKGROUND

With the popularity of ultra-high resolution video pictures in the market, video and image codecs increase a bandwidth burden to an external memory, and a large amount of data exchanges with external memories also increase power consumption of a chip. Video data compression is a way to solve the problem of bandwidth burden. There are generally three picture compression methods: lossy compression, lossless compression and hybrid compression consisting of lossy and lossless compression. Lossy compression generally employs a method of quantizing the data to be compressed. Lossless picture compression usually has two stages: prediction and entropy coding. The processing method at the first stage generally includes two types. One is prediction processing, e.g. spatial prediction, which is utilized to get a difference between data to be compressed and a predicted value, and then the second stage of processing will be performed. The other is transform processing, which is utilized to transform the data to be compressed to the frequency domain, and then the second stage of processing will be performed. The processing method at the second stage is usually entropy coding processing, in which variable length codes are typically used in encoding to achieve data compression.

Lossy compression typically yields an increase in compression rate at the expense of loss of video visual quality, which may lead to degraded visual quality of a current video picture. However, if the current video picture is used by the video encoder and decoders as a reference video picture for the subsequent video pictures, the quality loss of the current video picture may propagate to the subsequent video pictures, which further degrades the quality of the sequence of video pictures. Although the lossless compression may not degrade the quality of the video pictures, its data compression rate is low for video sequences with complex textures, and thus is not suitable for applications with relatively limited external memory bandwidth and footprint budgets.

Therefore, it is desirable to improve the existing methods of video data compression.

SUMMARY

An objective of the present application is to provide a method and apparatus for compressing video data, which can adaptively allocate buffer during compressing of preceding compression units, and further improve the efficiency of the picture buffer usage.

In one aspect of the present application, there is provided a method for compressing video data having one or more video pictures, wherein each of the one or more video pictures is divided into a plurality of compression units each having a pixel array, wherein the method comprises: A) determining a compression target for a picture buffer, the picture buffer being configured to buffer compressed video data picture by picture; B) calculating a unit buffer budget for each compression unit based on the compression target, a size of the pixel array of the compression unit and a bit depth of pixels of the pixel array; C) receiving the video data; and D) for a $k^{th}$ compression unit of each video picture of the video data, k being a positive integer: calculating a unit compression cost for the $k^{th}$ compression unit using a predetermined lossless compression algorithm, and an accumulated compression cost, wherein the accumulated compression cost is a total of the unit compression costs for compressing the $k^{th}$ compression unit and n compression units prior to the $k^{th}$ compression unit, and n being a positive integer smaller than k; and comparing the accumulated compression cost and an accumulated buffer budget for the $k^{th}$ compression unit, wherein the accumulated buffer budget is a total of the unit buffer budgets for compressing the $k^{th}$ compression unit and n compression units prior to the $k^{th}$ compression unit: compressing the $k^{th}$ compression unit using the predetermined lossless compression algorithm, if the accumulated compression cost does not exceed the accumulated buffer budget by a predefined value; or adjusting a quantization level of a predetermined lossy compression algorithm to maintain that the accumulated compression cost does not exceed the accumulated buffer budget by the predefined value, and compressing the $k^{th}$ compression unit using the predefined lossy compression algorithm with the adjusted quantization level, if the accumulated compression cost exceeds the accumulated buffer budget by the predefined value; wherein the predetermined lossy compression algorithm is a lossy compression algorithm configured with the quantization level, and the predefined value defines a threshold range by which the accumulated compression cost is allowed to exceed the accumulated buffer budget.

In certain embodiments, the plurality of compression units of each video picture is arranged in a matrix, and the $k^{th}$ compression unit and the n compression units prior to the $k^{th}$ compression unit are in a same row of the matrix.

In certain embodiments, compressing the $k^{th}$ compression unit using the predetermined lossless compression algorithm, if the accumulated compression cost does not exceed the accumulated buffer budget by a predefined value comprises: adjusting the quantization level of the predetermined lossy compression algorithm when compressing the $k^{th}$ compression unit using the predetermined lossless compression algorithm, such that a first compression unit subsequent to the $k^{th}$ compression unit is compressed using the predetermined lossy compression algorithm with its quantization level having an initial value equal to the adjusted quantization level during the compressing of the $k^{th}$ compression unit.

In certain embodiments, before comparing the accumulated compression cost and the accumulated buffer budget for the $k^{th}$ compression unit, the method further comprises: comparing the unit buffer budget with a unit compression cost for compressing the $k^{th}$ compression unit using the predetermined lossless compression algorithm: compressing the $k^{th}$ compression unit using the predetermined lossless compression algorithm, if the unit compression cost does not exceed the unit buffer budget; or perform the step of comparing the accumulated compression cost and the accumulated buffer budget for the $k^{th}$ compression unit, if the unit compression cost exceeds the unit buffer budget.

In certain embodiments, wherein compressing the $k^{th}$ compression unit using the predetermined lossless compression algorithm, if the unit compression cost does not exceed the unit buffer budget comprising: adjusting the quantization level of the predetermined lossy compression algorithm when compressing the $k^{th}$ compression unit using the predetermined lossless compression algorithm, such that a first compression unit subsequent to the $k^{th}$ compression unit is compressed using the predetermined lossy compression algorithm with its quantization level having an initial value equal to the adjusted quantization level during the compressing of the $k^{th}$ compression unit.

In certain embodiments, adjusting the quantization level of the predetermined lossy compression algorithm comprises: adjusting a value of the quantization level with a predetermined step.

In certain embodiments, for the $k^{th}$ compression unit, during adjusting the quantization level of the predetermined lossy compression algorithm, the quantization level has an initial value equal to a value of the quantization level used for compressing a $(k-1)^{th}$ compression unit.

In certain embodiments, each compression unit comprises a plurality of compression subunits, and each of the plurality of compression subunits is compressed with respective values of the quantization value.

In certain embodiments, the picture buffer comprises a buffer margin associated with the accumulated buffer budget, the buffer margin is configured to buffer a portion of the $k^{th}$ compression unit beyond the accumulated buffer budget, and the predefined value is based on a size of the buffer margin.

In certain embodiments, the size of the buffer margin is not smaller than a buffer space accumulatively occupied during adjusting the quantization level to a predetermined maximum value with the predetermined step, and the step of adjusting the quantization level of the predetermined lossy compression algorithm to maintain that the accumulated compression cost does not exceed the accumulated buffer budget by the predefined value comprises: adjusting the quantization level once from its initial value with the predetermined step, wherein the initial value is equal to a value of the quantization level used for compressing a $(k-1)^{th}$ compression unit.

In certain embodiments, the predetermined value is zero.

In certain embodiments, the step of adjusting the quantization level of the predetermined lossy compression algorithm to maintain that the accumulated compression cost does not exceed the accumulated buffer budget by the predefined value comprises: adjusting the quantization level with the predetermined step at least once from its initial value till that the accumulated compression cost does not exceed the accumulated buffer budget.

In certain embodiments, a luma component and a chroma component of the video data correspond to respective compression targets.

The foregoing is an overview of the present application, which may simplify, summarize, and omit details. Those skilled in the art will appreciate that this section is merely illustrative and not intended to limit the scope of the present application in any way. This summary section is neither intended to identify key features or essential features of the claimed subject matter nor intended to act as an auxiliary means for determining the scope of the claimed subject matter.

BRIEF DESCRIPTION OF THE DRAWINGS

The foregoing and other features of the present application will be more fully understood from the following description and the appended claims taken in conjunction with the accompanying drawings. It is to be understood that these drawings depict only a few embodiments of the contents of the present application and should not be construed as limiting the scope of the present application. The contents of the present application will be illustrated more clearly and in more detail with the accompanying drawings.

DETAILED DESCRIPTION OF THE EMBODIMENTS

In the following detailed description, reference is made to the accompanying drawings which form a part hereof. In the drawings, similar reference numerals generally refer to similar parts unless the context clearly dictates otherwise. The illustrative embodiments described in the detailed description, drawings and claims are not intended to be limiting. Other embodiments may be employed and other changes may be made without departing from the spirit or scope of the subject matter of the present application. It is to be understood that various configurations, substitutions, combinations and designs of the various forms of the present application, which are generally described in this application and are illustrated in the drawings, are intended to constitute a part of the present application.

Figure 1:
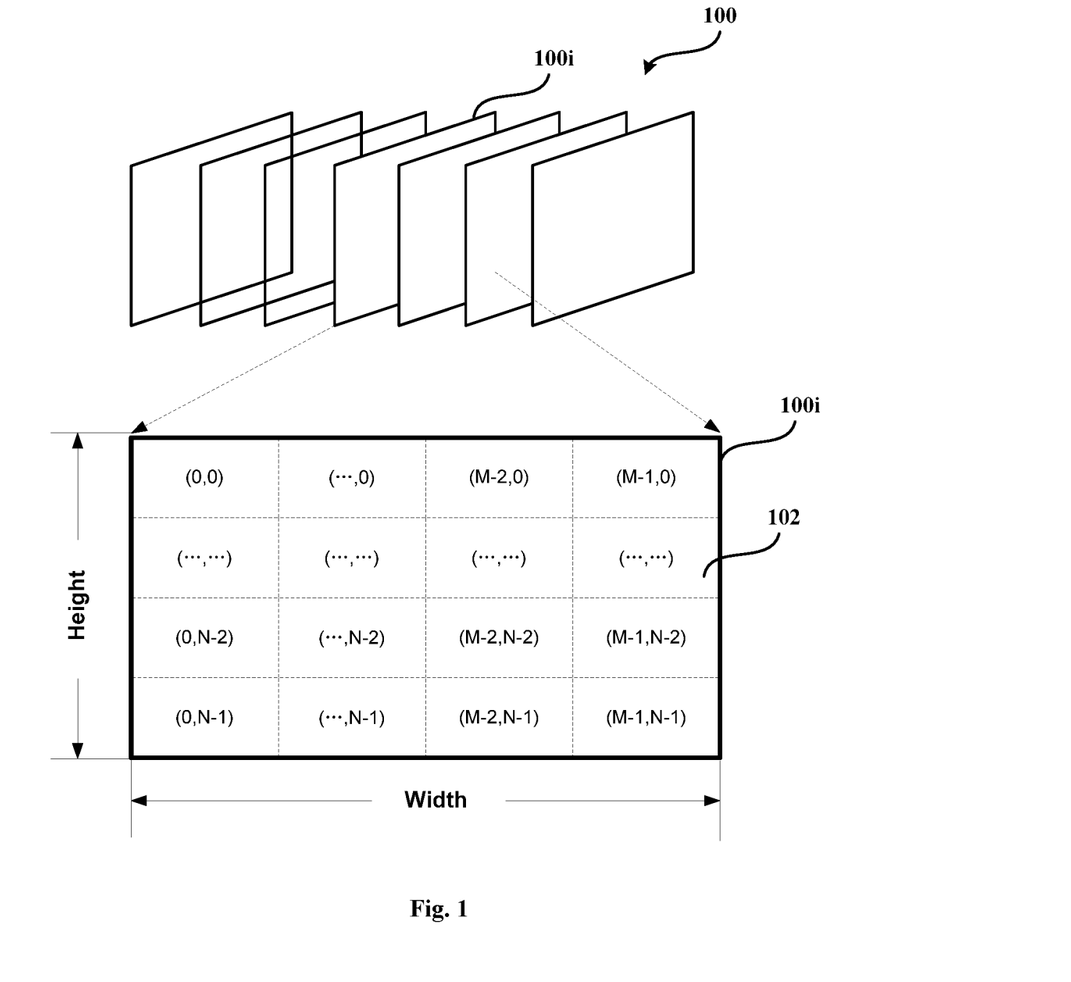
FIG. 1 illustrates an exemplary structure of video data according to an embodiment of the present application.

FIG. 1 illustrates an exemplary structure of video data 100 according to an embodiment of the present application.

As shown in FIG. 1, the video data 100 includes a sequence of video pictures. Prior to being compressed, each of the video pictures of the video data 100 has been divided into a plurality of compression units. For example, a video picture 100i is divided into an array of M×N compression units 102 as shown in FIG. 1, wherein the array has M columns and N rows of compression units 102 (M, N are positive integers greater than or equal to 1). Each compression unit 102 has a pixel array.

Figure 2:
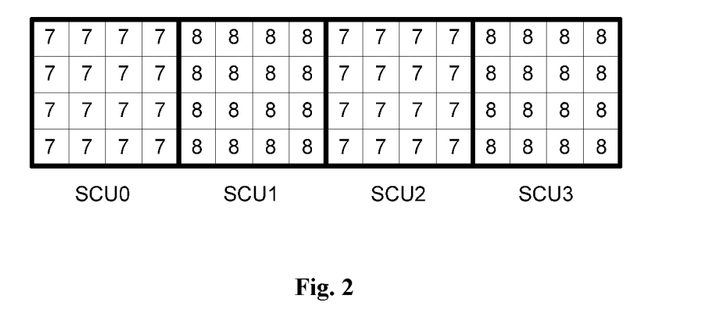
FIG. 2 illustrates an example of a compression unit.

FIG. 2 illustrates an example of a compression unit having 16 columns and 4 rows pixels, i.e., a total of 64 pixels. In some embodiments, each compression unit generally has one or more compression subunits. For example, in the example shown in FIG. 2, the compression unit has 4 compression subunits SCU0, SCU1, SCU2 and SCU3 each having a pixel subarray of 4×4 pixels.

Figure 3:
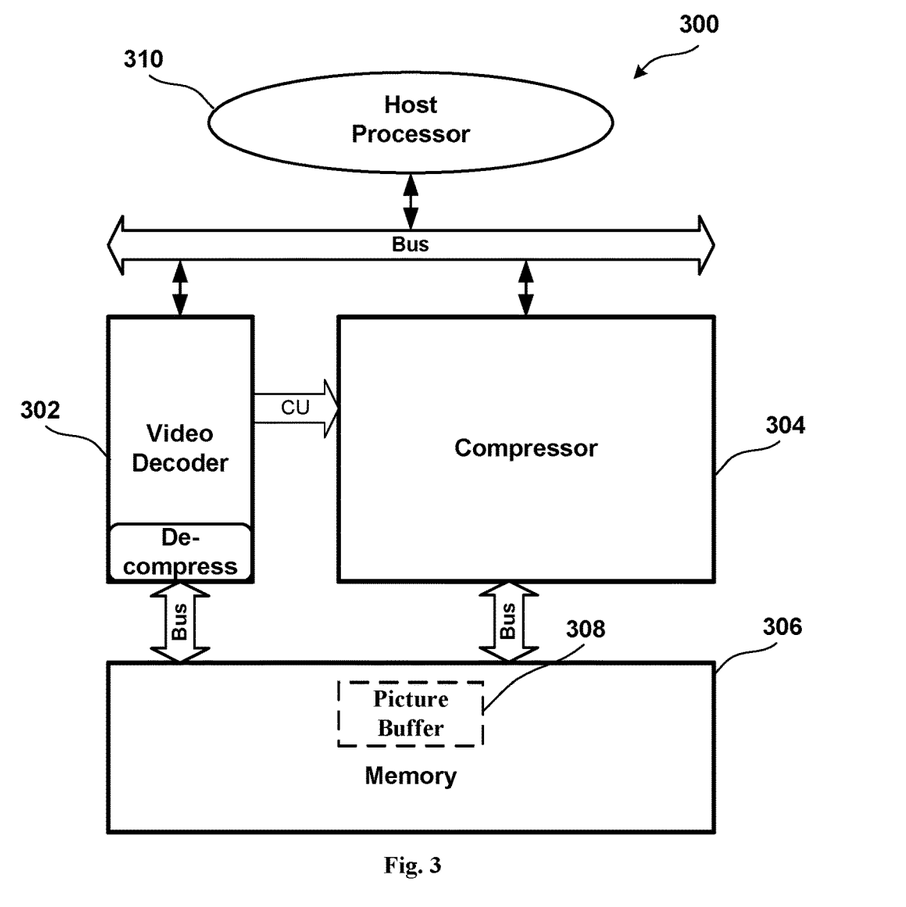
FIG. 3 illustrates a video processing system 300 according to an embodiment of the present application.

FIG. 3 illustrates a video processing system 300 according to an embodiment of the present application. The video processing system 300 may process video data such as those shown in FIGS. 1 and 2.

Specifically, as shown in FIG. 3, the video processing system 300 includes a video decoder 302 in which video elementary stream is decoded to obtain reconstructed video data. The reconstructed video data employs a specific video format, such as YUV format. It can be appreciated that, the method and apparatus of the present application may be used in compression processing by a video encoder to reconstruct video pictures in a similar manner. Thus, the decoder is described only as an example herein.

As shown in FIGS. 1 and 2, the reconstructed video data includes a plurality of video pictures, and each video picture is divided into a plurality of compression units (CU). In some embodiments, a picture dividing module (not shown) for dividing the video data may be coupled between the video decoder 302 and a compressor 304. In some other embodiments, the picture dividing module may be integrated within the video decoder 302 or the compressor 304. After being divided, the reconstructed video data is sent to the compressor 304 for compression.

The video decoder 302 and the compression processor 304 are both coupled to the host processor 310 via a bus. The host processor 310 is configured to control operation of the video decoder 302 and the compressor 304. The video decoder 302 and the compressor 304 are further coupled to an external memory 306 via the bus. A portion of the external memory 304 works as a picture buffer 308 for buffering the compressed video data picture by picture. The video data is transmitted via the bus between the compressor 304 and the picture buffer 308.

Figure 4:
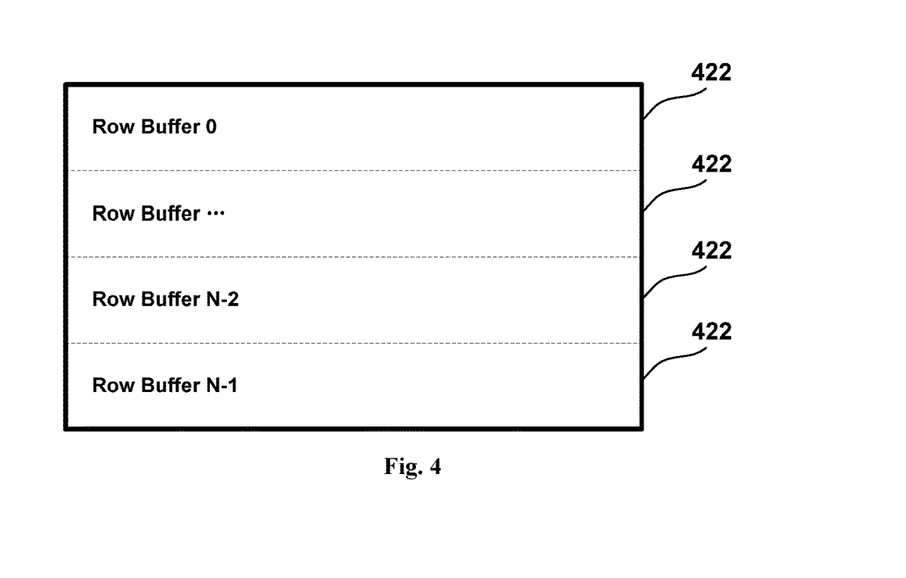
FIG. 4 illustrates an exemplary structure of a picture buffer.

FIG. 4 illustrates an exemplary structure of a picture buffer according to an embodiment of the present application. As shown in FIG. 4, the picture buffer is divided into multiple row buffers 422 each buffering pixel data (compressed by the compressor) of a row of compression units. For example, the picture buffer shown in FIG. 4 is divided into N row buffers from row buffer 0 to row buffer N−1. The row buffer 0 is for buffering compressed data of compression unit (0, 0) to compression unit (M−1, 0) of the video picture shown in FIG. 1. In some embodiments, the number of row buffers 422 included in the picture buffer depends on a height of each video picture and a height of each compression unit, or particularly equals to a quotient of the height of the video picture divided by the height of the compression unit.

It should be noted that, although FIG. 4 shows row buffers 422 each buffering data of a row of compression units, in some alternative embodiments, each row buffer 422 may buffer more than one row of compression units. For example, the picture buffer may be divided into N/2 row buffers (N is an even number), and accordingly, each row buffer buffers two rows of compression units of the video picture shown in FIG. 1. Alternatively, the picture buffer may be divided into N/3, N/4 or less row buffers.

It can be appreciated that the reduced number of row buffers means that each row buffer needs to buffer more compression units. But, besides that, the cooperative operation among the compressor, the picture buffer and the memory is substantially the same. In the following paragraphs, the picture buffer which is divided into N row buffers each buffering a row of compression units is given as an example, however, a person skilled in the art would understand that the picture buffer works similarly if the picture buffer is divided into less row buffers.

Figure 5A:
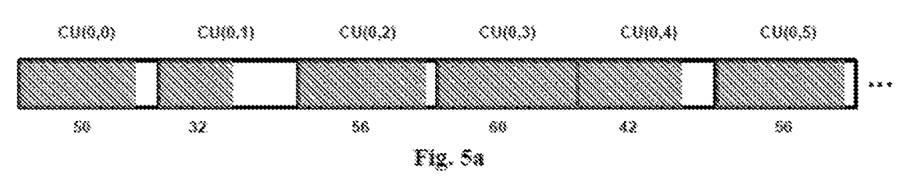
FIG. 5a illustrate a buffering process of a conventional row buffer.

When a conventional picture buffer is operated in conjunction with hybrid lossy/lossless compression algorithms, the buffer space of the picture buffer is generally configured based on the number of columns of compression units included in the video pictures, and each compression unit is assigned with a buffer space of fixed size. FIG. 5a illustrates a buffering process carried out by a conventional row buffer. As shown in FIG. 5a, assuming each compression unit has a pixel array of 16×4 pixels each having a bit depth of 10 bit, then each compression unit has a size of 640 bits, i.e. 80 bytes, before being compressed. If a compression target is to save 25% of the buffer space, then each compression unit is assigned with a buffer space of 60 bytes, that is to say, a unit buffer budget is 60 bytes. When each compression unit is being compressed, the processor may first determine a size of the compression unit after being compressed using the lossless compression algorithm, i.e. unit compression cost. Assuming that the size of the compressed compression unit CU(0, 0) is 50 bytes which is smaller than the unit buffer budget, the compression unit CU(0, 0) can be compressed using the lossless compression algorithm and further stored in a corresponding buffer space of the row buffer. Similarly, assuming the sizes of the compression units CU(0, 1), CU(0, 2), CU(0, 4) and CU(0, 5) after being compressed using the lossless compression algorithm are 32, 56, 42 and 56, respectively, each of which does not exceed the size of the corresponding buffer space, then these compression units can be compressed using the lossless compression algorithm. However, as to the compression unit CU(0, 3), the calculated unit compression cost is 80 bytes which exceeds the corresponding unit buffer budget. In this case, if it is compressed using the conventional method, the compression unit CU (0, 3) needs to be compressed using the lossy compression algorithm to a size less than 60 bytes, which degrades the visual quality of the video data.

The inventors of the present application have found that the above conventional method does not make full use of the buffer space, especially when the unit compression cost is less than the unit buffer budget. For example, for the compression unit CU(0, 0), the unit compression cost using the lossless compression algorithm is 50 bytes while the unit buffer budget is 60 bytes. That is, a buffer space of 10 bytes is wasted. Similarly, the wasted buffer spaces for the compression units CU(0, 1), CU(0, 2), CU(0, 4) and CU(0, 5) are 28, 4, 18 and 4 bytes, respectively. The inventors noted that the buffer space of the row buffer can be fully used if the buffer space of the entire row is considered as a whole and each compression unit is not assigned with a buffer space of fixed size.

Figure 5B:
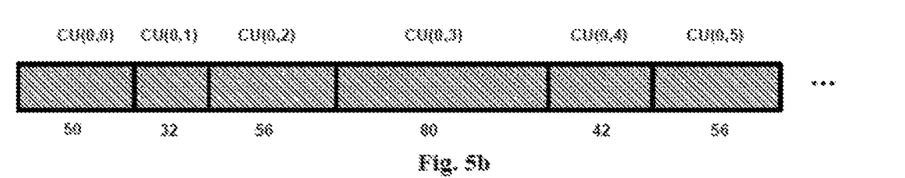
FIG. 5b illustrates an example of an adaptive buffering process according to an embodiment of the present application.

FIG. 5b illustrates an adaptive buffering process according to an embodiment of the present application. As shown in FIG. 5b, the compression units may not be assigned with buffer spaces of fixed size in advance. Accordingly, after the compressed data of a current compression unit is buffered in the row buffer, the compressed data of a compression unit next to the current compression unit may be buffered immediately subsequent to the compressed data of the current compression unit in the row buffer. In other words, the compression units may substantially use the buffer space of the row buffer according to their respective unit compression costs using the lossless compression algorithm. For example, the compression units CU(0, 1), CU(0, 2), CU(0, 3), CU(0, 4) and CU(0, 5) may use buffer spaces of 32, 56, 80, 42 and 56 bytes, respectively. Since at least not all of these compression units need to be compressed using the lossy compression algorithm, the visual quality of the video is improved. On the other hand, even if the six compression units are compressed using the lossless compression algorithm, the occupied buffer space of the row buffer is still smaller than that occupied using the convention method after the compression unit CU(0, 5) has been buffered. That is, the buffering efficiency is improved significantly.

It can be appreciated that, in some cases, the unit compression costs for some compression units at the beginning of a row of compression units may be relatively high and exceed the respective expected unit buffer budgets. For example, assuming the unit compression cost for a first compression unit CU(0, 0) is 70 bytes which exceeds the unit buffer cost of 60 bytes. In addition, the compressor cannot expect what the unit compression costs for the subsequent compression units are. In this case, if the compression unit is still compressed using the lossless compression algorithm, the row buffer may overflow. In order to solve this problem, the inventors conceived a method in which each compression unit may be still assigned with a unit buffer budget, but the compressed data of the $k^{th}$ compression unit may be buffered in the buffer space saved in compressing the previous k−1 compression units.

Figure 5C:
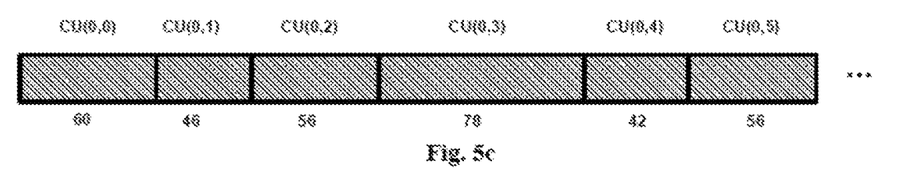
FIG. 5c illustrates another example of an adaptive buffering process according to an embodiment of the present application.

FIG. 5c illustrates an adaptive buffering process according to another embodiment of the present application. As shown in FIG. 5c, assuming the unit compression costs for the compression units CU(0, 0) CU(0, 1), CU(0, 2), CU(0, 3), CU(0, 4) and CU(0, 5) using the lossless compression algorithm are 70, 46, 56, 80, 42 and 56 bytes, respectively, then the buffer space assigned to the compression unit CU(0, 0) is 60 bytes (i.e. equal to the unit buffer budget). Thus, it is desired to compress the compression unit CU(0, 0) to 60 bytes using the lossy compression algorithm. A buffer space of (60−46) bytes is saved in compressing the compression unit CU(0, 1) and a buffer space of (60−56) bytes is saved in compressing the compression unit CU(0, 2), which totals 18 bytes. Accordingly, when the compression unit CU(0, 3) is being compressed, the saved 18 bytes can be used for buffering the compressed data of the compression unit CU(0, 3), and thus it is desired to compress the compression unit CU(0, 3) to 78 bytes using the lossy compression algorithm. Only two bytes of data is lost in compressing the compression unit CU(0, 3). It can be seen that the video visual quality is improved by this adaptive buffering process while avoiding overflow of the picture buffer.

In the embodiment shown in FIG. 5c, when compressing neighboring compression units, they may be compressed with quantization levels significantly different from each other, which may lead to significant differences in the video visual quality in different regions of the video, and thus adversely affect the visual quality of display and may introduce visible artifact. In some embodiments, neighboring compression units may be compressed with quantization levels close to each other, for example, by adjusting the quantization level gradually at a fixed step. For example, the quantization levels for compressing two neighboring compression units may differ by up to a step. The gradual adjusting of quantization level may lead to more uniform video and better visual quality. However, the gradual adjusting of quantization level may also lead to overflow of the row buffer, since the quantization level is gradually adjusted and cannot be strictly set according to the size of the row buffer. In order to resolve the overflow issue, in some embodiments, each row buffer may have a buffer margin of certain size, and the buffer margin can be used to buffer the overflowed data temporarily. The size of each buffer margin can be predetermined, for example, according to the requirement of the gradual adjusting of quantization level. In this way, during calculating the corresponding quantization level for compressing each compression unit, the accumulated compression cost and the accumulated buffer budget can be compared with each other. As long as the accumulated compression cost for the current compression unit does not exceed the accumulated buffer budget by a predetermined value, the current compression unit can be compressed using the unadjusted quantization level. The predetermined value corresponds to the size of the buffer margin of the row buffer. It should be noted that, in some embodiments such as the embodiment shown in FIG. 5, the row buffer does not have the buffer margin, and accordingly the predetermined value is zero.

In other words, the picture buffer includes the buffer margin for the accumulated buffer budget, which is used to buffer a portion of the compressed $k^{th}$ compression unit which exceeds the accumulated buffer budget, and the predetermined value is based on the size of the buffer margin. In some embodiments, the size of the buffer margin is determined based on the compression target of the picture buffer, and during adjusting the quantization level, the quantization level may be adjusted once from its original value with the predetermined step. The original value of the quantization level is equal to the value of the quantization level used for compressing the $(k-1)^{th}$ compression unit.

Figure 5D:
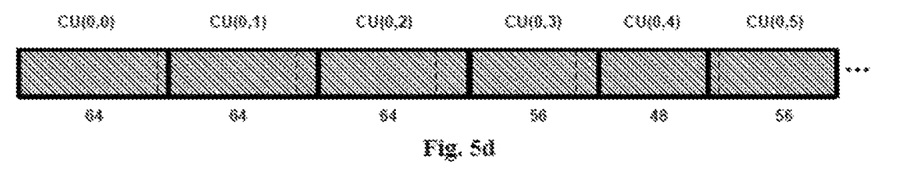
FIG. 5d illustrates another example of an adaptive buffering process according to an embodiment of the present application.

FIG. 5d illustrates an adaptive buffering process according to another embodiment of the present application. As shown in FIG. 5d, the calculated unit compression costs for compressing the compression units CU(0, 0), CU(0, 1), CU(0, 2), CU(0, 3), CU(0, 4) and CU(0, 5) using the above method are 64, 64, 64, 56, 48 and 56 bytes, respectively. And the quantization levels for compressing these compression units are 2, 2, 2, 3, 4 and 3 respectively, wherein the minimum step for adjusting the quantization level is 1. Moreover, the buffer margin has a size of 15 bytes and the unit buffer budget is 60 bytes. Particularly, for compressing the compression units CU(0, 0), CU(0, 1) and CU(0, 2), the accumulated compression costs exceed the accumulated buffer budgets by 4, 8 and 12 bytes, respectively, all of which do not exceed the 15-byte buffer margin. In such case, these compression units can be compressed using the quantization level of 2. However, if the compression unit CU(0, 3) is still compressed using the quantization level of 2, the accumulated compression cost for CU(0, 3) with quantization level of 2 will exceed the accumulated buffer budget by 16-byte (16-byte>15-byte). Accordingly, the compression unit CU(0, 3) may be compressed using the quantization level of 3 to reduce occupation of the buffer margin. Next, the compression unit CU(0, 4) may be compressed using the quantization level of 4 to further release the buffer margin. After the compression of the compression unit CU(0, 4), the buffer margin is fully released. Thus, the next compression unit may be compressed using either the lossless compression algorithm or the lossy compression algorithm with degraded quantization level. In some embodiments, since the buffer margin is released, the quantization level for compressing the subsequent compression unit(s) can be degraded to improve the visual quality of the compressed video.

Figure 5E:
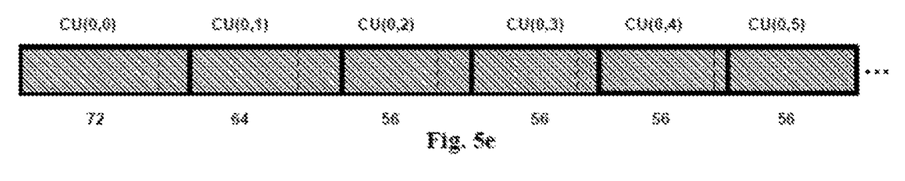
FIG. 5e illustrates another example of an adaptive buffering process according to an embodiment of the present application.

FIG. 5e illustrates an adaptive buffering process according to another embodiment of the present application. As shown in FIG. 5e, assume that the unit compression costs for compressing the compression units CU(0, 0), CU(0, 1), CU(0, 2), CU(0, 3), CU(0, 4) and CU(0, 5) using the lossless compression algorithm are 80, 78, 78, 76, 75 and 80 bytes, respectively, and the quantization level is initially set as zero, the step of adjusting the quantization level is 1, the unit buffer budget is 60 bytes, the maximum value of the quantization level is 3, and the quantization level cannot be adjusted to greater than the maximum quantization level of 3. The size of the buffer margin (corresponding to the predetermined value by which the accumulated compression cost can exceed the accumulated buffer budget) can be predetermined as 16 bytes, for example. The lossless unit compression cost for the compression unit CU(0, 0) is 80 bytes, and thus the accumulated compression cost is 80 bytes. The accumulated compression cost of 80 bytes exceeds the unit buffer budget of 60 bytes which is also the accumulated buffer budget for CU(0, 0). Moreover, the accumulated compression cost exceeds the accumulated buffer budget by 20 bytes which is greater than the predetermined value of 16 bytes. Accordingly, the quantization level is adjusted to 1. Since the lossless unit compression cost for the compression unit CU(0, 0) is greater than the lossy unit compression cost with the adjusted quantization level, it is desired to use the adjusted quantization level to compress the compression unit CU(0, 0). Therefore, the adjusted unit compression cost for compressing the compression unit CU(0, 0) is 72 bytes which is also the accumulated compression cost. The accumulated compression cost (72 bytes) for the compression unit CU(0, 0) does not exceed the accumulated buffer budget (60 bytes) by the predetermined value (16 bytes).

Next, the lossless unit compression cost for the compression unit CU(0, 1) is 78 bytes, and then the accumulated compression cost is 150 bytes (i.e. 72+78 bytes). The accumulated buffer budget is 120 bytes (i.e. 60×2 bytes). In such case, the lossless unit compression cost for the compression unit CU(0, 1) exceeds the unit buffer budget, and the accumulated compression cost (150 bytes) for the compression unit CU(0, 1) exceeds the accumulated buffer budget (120 bytes) by 30 bytes which is greater than the predetermined value of 16 bytes. Accordingly, the quantization level is adjusted from 1 to 2. Since the lossless unit compression cost for the compression unit CU(0, 1) is greater than the lossy unit compression cost with the adjusted quantization level, it is desired to compress the compression unit CU(0, 1) with the adjusted quantization level of 2. Thus, the unit compression cost for the compression unit CU(0, 1) is 64 bytes, and the accumulated compression cost is 136 bytes (i.e. 72+64 bytes) which does not exceed the accumulated buffer budget of 120 bytes by the predetermined value of 16 bytes.

Next, the lossless unit compression cost for the compression unit CU(0, 2) is 78 bytes, and the accumulated compression cost is 214 bytes (i.e. 136+78 bytes) while the accumulated buffer budget is 180 bytes (i.e. 60×3 bytes). The unit compression cost for the compression unit CU(0, 2) is greater than the unit buffer budget, and the accumulated compression cost for the compression unit CU(0, 2) exceeds the accumulated buffer budget by the predetermined value. Accordingly, the quantization level is adjusted from 2 to 3. Since the lossless unit compression cost for the compression unit CU(0, 2) exceeds the lossy unit compression cost with the adjusted quantization level, it is desired to compress the compression unit CU(0, 2) with the adjusted quantization level of 3. Thus, the unit compression cost for the compression unit CU(0, 2) is 56 bytes, and the accumulated compression cost is 192 bytes (i.e. 136+56 bytes) which does not exceed the accumulated buffer budget of 180 bytes by the predetermined value of 16 bytes.

Next, the lossless unit compression cost for the compression unit CU(0, 3) is 76 bytes, and the accumulated compression cost is 268 bytes (i.e. 192+76 bytes) while the accumulated buffer budget is 240 bytes (i.e. 60×4 bytes). The unit compression cost for the compression unit CU(0, 3) is greater than the unit buffer budget, and the accumulated compression cost for the compression unit CU(0, 3) exceeds the accumulated buffer budget by the predetermined value. Accordingly, the quantization level is maintained as 3 which is the maximum quantization level. Since the lossless unit compression cost for the compression unit CU(0, 3) exceeds the lossy unit compression cost with the maintained quantization level, it is desired to compress the compression unit CU(0, 3) with the quantization level of 3. Thus, the unit compression cost for the compression unit CU(0, 3) is 56 bytes, and the accumulated compression cost is 248 bytes (i.e. 192+56 bytes) which does not exceed the accumulated buffer budget of 240 bytes by the predetermined value of 16 bytes.

Next, the lossless unit compression cost for the compression unit CU(0, 4) is 75 bytes, and the accumulated compression cost is 323 bytes (i.e. 248+75 bytes) while the accumulated buffer budget is 300 bytes (i.e. 60×5 bytes). The unit compression cost for the compression unit CU(0, 4) is greater than the unit buffer budget, and the accumulated compression cost for the compression unit CU(0, 4) exceeds the accumulated buffer budget by the predetermined value. Accordingly, the quantization level is maintained as 3 which is the maximum quantization level. Since the lossless unit compression cost for the compression unit CU(0, 4) exceeds the lossy unit compression cost with the maintained quantization level, it is desired to compress the compression unit CU(0, 4) with the quantization level of 3. Thus, the unit compression cost for the compression unit CU(0, 4) is 56 bytes, and the accumulated compression cost is 304 bytes (i.e. 248+56 bytes) which does not exceed the accumulated buffer budget of 300 bytes by the predetermined value of 16 bytes.

Next, the lossless unit compression cost for the compression unit CU(0, 5) is 80 bytes, and the accumulated compression cost is 384 bytes (i.e. 304+80 bytes) while the accumulated buffer budget is 360 bytes (i.e. 60×6 bytes). The unit compression cost for the compression unit CU(0, 5) is greater than the unit buffer budget, and the accumulated compression cost for the compression unit CU(0, 5) exceeds the accumulated buffer budget by the predetermined value. Accordingly, the quantization level is maintained as 3 which is the maximum quantization level. Since the lossless unit compression cost for the compression unit CU(0, 5) exceeds the lossy unit compression cost with the maintained quantization level, it is desired to compress the compression unit CU(0, 5) with the quantization level of 3. Thus, the unit compression cost for the compression unit CU(0, 5) is 56 bytes, and the accumulated compression cost is 360 bytes (i.e. 304+56 bytes). At this point, the accumulated compression cost is equal to the accumulated buffer budget, and thus the next compression unit can be compressed using either the lossless compression algorithm or the lossy compression algorithm with degraded quantization level.

In the embodiment shown in FIG. 5e, only the unit compression costs for the compression units CU(0, 0) and CU(0, 1) exceed the unit buffer budget, and a sum of the portion beyond the accumulated buffer budget is 16 (i.e. 72+64−120) bytes. In other words, the size of the buffer margin should be no less than 16 bytes, and thus the predetermined value is 16 bytes. For example, the size of the buffer margin is not less than the accumulated buffer space occupied during the compression and buffering process while the quantization level is adjusted with the predetermined step until the maximum quantization level. Thus, the size of the buffer margin is determined based on the adjustment step, the maximum quantization level and the unit buffer budget (or compression target). In the embodiment shown in FIG. 5e, the buffer margin corresponds to the maximum quantization level (the lossy unit compression cost with the maximum quantization level is 56 bytes which is smaller than the unit buffer budget of 60 bytes), and the unit buffer budget can be overdrawn in some extent, as is shown with reference to the compression units CU(0, 0) and CU(0, 1). It can be understood that, in other embodiments, either the unit compression cost for the compression unit CU(0, 0), CU(0, 1), CU(0, 2), CU(0, 3), CU(0, 4) or CU(0, 5) is not greater than the unit buffer budget, or the accumulated compression cost for a compression unit does not exceed the corresponding accumulated buffer budget by the predetermined value, or the lossless unit compression cost for a compression unit is not greater than the lossy unit compression cost with the adjusted quantization level. In such case, a compression unit can be compressed using lossless compression algorithm and the compression unit(s) subsequent to the compression unit can be compressed using the process shown in FIG. 5e.

Figure 6:
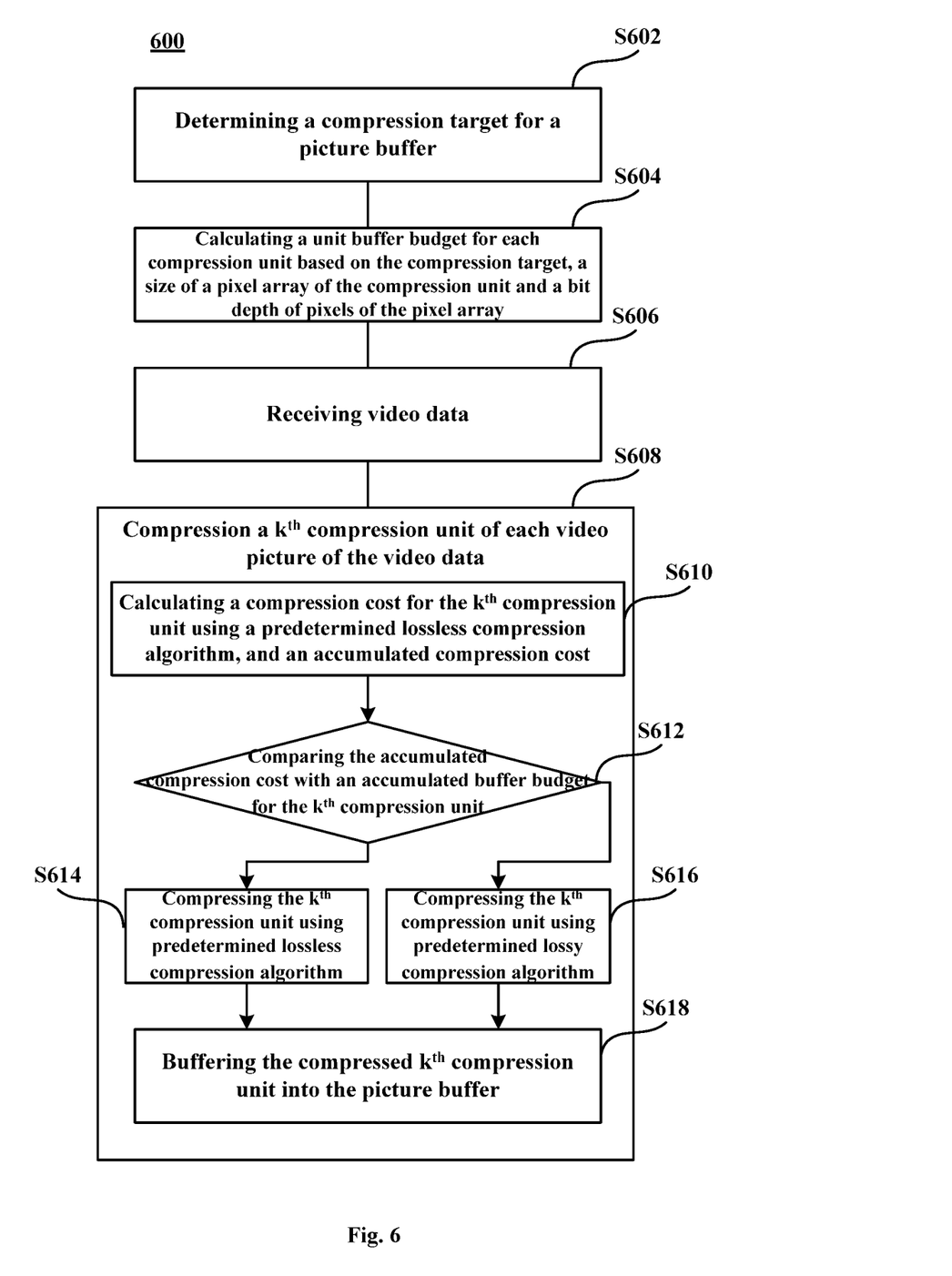
FIG. 6 illustrates a method for compressing video data according to an embodiment of the present application.

Based on the above inventive concept, the present application provides a method for compressing video data. FIG. 6 illustrates a method 600 for compressing video data. The method 600 can be implemented by the video processing system 300 shown in FIG. 3, e.g. executed by the compressor 304, to compress and buffer the video data as shown in FIGS. 1 and 2.

As shown in FIG. 6, in step S602, a compression target for a picture buffer is determined. For example, the compression target may be determined as saving S % of the buffer space of the picture buffer. The compression target may be adjusted or design according to actual needs of the system.

Next, in step S604, a unit buffer budget for each compression unit is calculated based on the compression target, a size of a pixel array of the compression unit and a bit depth of pixels of the pixel array. With reference to FIGS. 1 and 4 as an example, assuming each row buffer is used to buffer a row of compression units, and each compression unit includes a pixel array of 16×4 pixels each having a bit depth of 10 bit, then the unit buffer budget for each compression unit is 640×(1−S %) bits, i.e. 80×(1−S %) bytes. The unit buffer budget is 60 bytes when S is equal to 25.

Next, in step S606, video data such as a video elementary stream is received. The video elementary stream is decoded by the video decoder and further divided into a plurality of compress units.

Afterwards, in step S608, a $k^{th}$ compression unit of each video picture of the video data may be compressed. The parameter k is a positive integer.

Specifically, step 608 may include the following steps.

In step 610, a unit compression cost for the $k^{th}$ compression unit using a predetermined lossless compression algorithm is calculated, and an accumulated compression cost is calculated as well. The accumulated compression cost is a total of the unit compression costs for compressing the $k^{th}$ compression unit and n compression units prior to the $k^{th}$ compression unit, wherein n is a positive integer smaller than k. If buffered using the row buffers shown in FIG. 4, the accumulated compression cost is a total of the unit compression costs for compressing the first compression unit to the $(k-1)^{th}$ compression unit in the same row. See the examples shown in FIGS. 5c, 5d and 5e.

In step S612, the accumulated compression cost and an accumulated buffer budget for the $k^{th}$ compression unit is compared with each other. The accumulated buffer budget is a total of the unit buffer budgets for compressing the $k^{th}$ compression unit and n compression units prior to the $k^{th}$ compression unit.

Based on the comparison between the accumulated compression cost and the accumulated buffer budget, it may be determined whether to use a lossless compression algorithm or a lossy compression algorithm to compress the $k^{th}$ compression unit. Particularly, if the accumulated compression cost does not exceed the accumulated buffer budget by a predefined value, the $k^{th}$ compression unit is compressed using the predetermined lossless compression algorithm, as is shown in step S614. However, if the accumulated compression cost exceeds the accumulated buffer budget by the predefined value, the $k^{th}$ compression unit is compressed using the predefined lossy compression algorithm, as is shown in step S616. It would be appreciated that, after the lossy compression of the $k^{th}$ compression unit, the calculation of the accumulated compression cost for the $(k+1)^{th}$ compression unit may be based on the lossy unit compression cost for the $k^{th}$ compression unit. The predetermined lossy compression algorithm is a lossy compression algorithm configured with a quantization level. After that, in step S618, the compressed $k^{th}$ compression unit is buffered into the picture buffer.

It should be noted that, the above lossy compression algorithm is a lossy compression algorithm configured with quantization level. For example, the lossy compression algorithm is pulse code modulation (PCM) compression algorithm, and the quantization level is a parameter associated with the compression rate of the lossy compression algorithm. Still with reference to the compression unit shown in FIG. 2 which has a pixel array of 16×4 pixels, the compression unit has four compression subunits each corresponding to a smaller pixel array. Assuming each pixel has a bit depth of 10 bits, then the quantization level of 2 means that the remaining bit depth of each pixel after compressed is 8 bits. In some embodiments, the value of the quantization level is an integer. For example, a 3-bit binary number may represent the value of the quantization level from 0 to 7. In some other embodiments, the value of the quantization level may be a decimal number. For example, the quantization level for the compression subunits SCU0 and SCU2 of the compression unit shown in FIG. 2 is set to be 3 (i.e. a bit depth value of 7), while the quantization level for the compression subunits SCU1 and SCU3 is set to be 2 (i.e. a bit depth value of 8). As such, the quantization level for the entire compression unit is equal to 2.5. Similarly, if only one of the four compression subunits has a quantization level of 3, and the other three have a quantization level of 2, then the quantization level of the entire compression unit is equal to 2.25. It can be appreciated that the precision of the quantization level of the compression unit can be further improved to 0.125 if the compression unit can be divided into 8 compression subunits each having a pixel array of 2×4 pixels. In other words, the precision of the quantization level for the entire compression unit can be improved by setting respective values for the quantization levels of the compression subunits, and thus the compression target is more controllable.

It should be noted that, in some embodiment, when compressing the $k^{th}$ compression unit using the predetermined lossless compression algorithm (e.g. in step S614), the value of the quantization level may be unchanged. Accordingly, the initial value of the quantization level for the first compression unit that may be compressed using the lossy compression algorithm can be set to be the unchanged value of the quantization level. Moreover, if other subsequent compression units need to be compressed using the lossy compression algorithm, the value of the quantization level thereof can be adjusted.

In some other embodiments, when compressing the $k^{th}$ compression unit using the lossless compression algorithm, the value of the quantization level can be adjusted (e.g. degraded) at the same time. If multiple consecutive compression units are compressed using the lossless compression algorithm, the value of the quantization level can be adjusted multiple times till a minimum value of the quantization level. In this way, the initial value of the quantization level for the first compression unit subsequent to the $k^{th}$ compression unit that may be compressed using the lossy compression algorithm can be set to be the adjusted value of the quantization level during the lossless compression.

In view of the above, in step S616, when compressing the $k^{th}$ compression unit using the lossy compression algorithm, the value of the quantization level can be adjusted to maintain the unit compression cost for the $k^{th}$ compression within a desired range. Particularly, depending on the remaining amount of the accumulated buffer budget, the value of the quantization level can be adjusted to maintain that the accumulated compression cost does not exceed the accumulated buffer budget by a predetermined value. As described above, the predetermined value depends on a size of a buffer margin, which may be zero or non-zero. With reference to the compression unit shown in FIG. 2, if the size of the buffer margin is zero and the predetermined value is zero, the size of the compression unit shown in FIG. 2 without compression is 80 bytes. Assuming that the unoccupied portion of the accumulated buffer budget is 65 bytes, the unit compression cost with the quantization level of 1 is 72 bytes which does not meet the requirement. Moreover, the unit compression cost with the quantization level of 2 is 64 bytes which meets the requirement of the accumulated buffer budget. Accordingly, the quantization level may be set to be 2 when the compression unit is compressed using the lossy compression algorithm. It can be appreciated that, in some embodiments, the quantization level may be adjusted with a predetermined step. For example, if the accumulated compression cost calculated with the quantization level of 1 cannot meet the requirement, the accumulated compression cost may be re-calculated with the quantization level of 2 (differ from the previous value 1 by one step of 1) and further compared with the accumulated buffer budget. If the updated accumulated compression cost still cannot meet the requirement, the accumulated compression cost may be re-calculated with the quantization level of 3 and further compared with the accumulated buffer budget. The process may continue for several times until the accumulated compression cost is smaller than or equal to the accumulated buffer budget. It can be seen that, in such case, the quantization level can be measured by decimal numbers, which facilitates more fine-grained calculation and adjustment of accumulated compression cost. Still with reference to the compression unit shown in FIG. 2, assuming that the size of the buffer margin is not zero and the predetermined value is not zero, the compression unit shown in FIG. 2 is 80 bytes without compression. If the remaining portion of the accumulated buffer budget is 65 bytes and the quantization level for the preceding compression unit is 0, then the quantization level for the current compression unit may be adjusted to 1, and the unit compression cost for lossy compression of the current compression unit with the adjusted quantization level is 72 bytes. Accordingly, 7 bytes (i.e. 72–65 bytes) of the buffer margin may be occupied by the compressed current compression unit, and the compression of the current compression unit is over. In some embodiments, the size of the buffer margin may be predetermined based on the buffer space which is accumulatively occupied by the compression of the compression units when the quantization level is adjusted with the predetermined step until a predetermined maximum value. It can be appreciated that, thanks to the buffer margin, the process of compressing the compression unit is simplified.

It can be appreciated that the contents of the neighboring compression units in the same row may be associated with each other. Accordingly, in some embodiments, in step S616 of adjusting the quantization level, the initial value of the quantization level for the $k^{th}$ compression unit may be set to be the value of the quantization level for compressing the $(k-1)^{th}$ compression unit. In this way, the quantization level can be adjusted from the initial value till when the requirement is met. In some other embodiments, the initial value of the quantization level can be set to be the maximum or minimum value, and afterwards the quantization level can be adjusted with the predetermined step.

In some embodiments, the difference between the respective quantization levels for two neighboring compression units in the same row may be smaller than or equal to a predetermined threshold. For example, the difference can be equal to the predetermined step for adjusting the quantization level. For example, assuming that the predetermined step for quantization level is 0.5, then the quantization level may change in an order of 0, 0.5, 1, 1.5, 2, 2.5, 2.5, 2, 1.5, 1, 0.5 and 0 from the consecutive compression units in the same row, rather than in another order of 0, 2.5, 2.5, 2.5, 2.5, 2.5, 2.5, 2.5, 2.5, 2.5, 2.5 and 0 (the quantization level changes significantly between the first and second compression units and between the last one and the last but one compression unit). The gradually changing quantization level helps to improve the visual quality of the compressed video.

In practice, thanks to the comparison step of step S612, after each of the compression units is compressed and buffered in the row buffer, the accumulated buffer budget for the row buffer may generally not be exceeded by the predetermined value. Thus, if the lossless unit compression cost for the next compression unit does not exceed the predetermined unit buffer budget, the accumulated buffer budget after the compressed compression unit is buffered may not be exceeded by the predetermined value. Therefore, in some embodiments, before step S612, the unit compression cost and the unit buffer budget for compressing the $k^{th}$ compression unit using the predetermined lossless compression algorithm may be compared with each other: if the unit compression cost is not greater than the unit buffer budget, the $k^{th}$ compression unit may be compressed using the lossless compression algorithm; if the unit compression cost is greater than the unit buffer budget, the method may proceed with step S612. By doing this the efficiency of the entire compression process is improved. Similar to step S614, in some embodiments, when compressing the $k^{th}$ compression unit using the predetermined lossless compression algorithm, the value of the quantization level may not change. Accordingly, for the first compression unit subsequent to the $k^{th}$ compression which requires lossy compression, the initial value of its quantization level may be equal to the value of the unchanged quantization level. In some other embodiments, when compressing the $k^{th}$ compression unit using the predetermined lossless compression algorithm, the value of the quantization level may be adjusted (e.g. degraded) at the same time. In this way, for the first compression unit subsequent to the $k^{th}$ compression which requires lossy compression, the initial value of its quantization level may be equal to the value of the quantization level which changes during the lossless compression.

Generally, the color video data may have a special encoding format such as the YUV format. Accordingly, a luma component and a chroma component of the video data may be represented by different pixel arrays. Thus, different compression targets may be provided to the luma and chroma components, as long as the compression target for the entire video data meets the expected design requirement. For example, for a YUV420 video, the luma component data may save Sy % while the chroma component data may save Sc % to meet the compression target of S %, wherein S, Sy and Sc satisfy the equation 2×Sy+Sc=3×S. S, Sy and Sc are all positive intergers, and Sy<=S and Sc>=S, or Sy>=S and Sc<=S. For example, S=25, Sy=20, and then Sc=35.

The method shown in FIG. 6 may be implemented by the video processing system 300 shown in FIG. 3. The video processing system 300 may include an apparatus for compressing video data according to an embodiment of the present application. The apparatus may include instruction storing medium for storing computer executable instruction, a processor (e.g the compressor 304 shown in FIG. 3) and a picture buffer. The processor may perform the steps of the method shown in FIG. 6 by executing instructions. It can be appreciated that, in some embodiments, the apparatus for compressing video data may be implemented by software, hardware, firmware of combination thereof.

Figure 7:
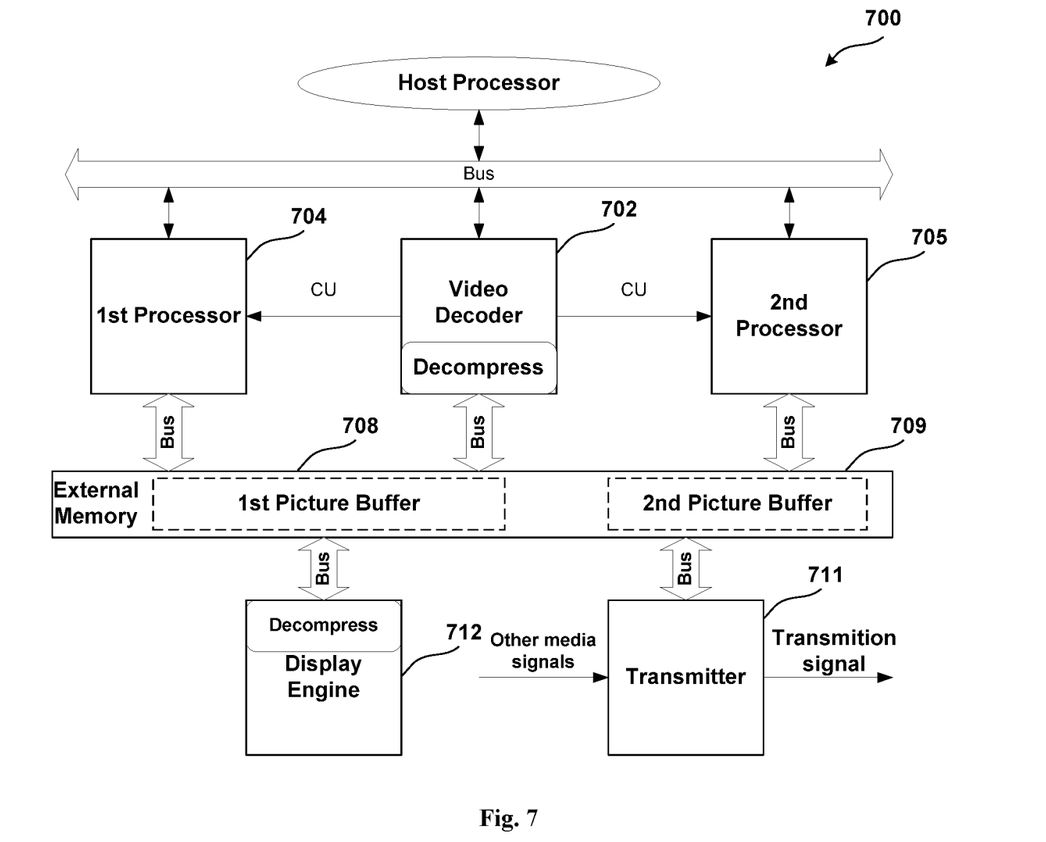
FIG. 7 illustrates an apparatus for compressing video data.

FIG. 7 illustrates a video processing system 700 according to another embodiment of the present application.

As shown in FIG. 7, the video processing system 700 includes two compression/buffer modules, i.e. a first compressor 704 and a first picture buffer 708, and a second compressor 705 and a second picture buffer 709. The first compressor 704 obtains from the video decoder 702 compression units of the reconstructed video data, compresses each of the compression units and writes the compressed video data into the first picture buffer 708 in an external memory via a bus. Similarly, the second compressor 705 obtains from the video decoder 702 compression units of the reconstructed video data, compresses each of the compression units and writes the compressed video data into the second picture buffer 709 in the external memory via the bus.

Data compressed by the two compression/buffer modules have different use. Specifically, the data processed by the first compression/buffer module may be provided to a local display engine 712 for subsequent video display. The data processed by the second compression/buffer module may be provided to a transmitter 711 along with other media signals, and further transmitted out after mixed by the transmitter 711 as a transmission signal, such that the data can be used by a remote display device. The remote display device may have a corresponding decompression module to decompress the compressed data in the transmission signal for subsequent display.

Both of the two compression/buffer modules can use the method shown in FIG. 6 to compress video data (or use lossless compression only). In some embodiments, the compression target for the first compression/buffer module may be set as a smaller value such as smaller than 10%, and the compression target for the second compression/buffer module may be set as a greater value such as smaller than 30%. In other words, the compression targets for the two compression/buffer modules are different. The reason for such design is that, the data compressed by the second compression/buffer module may be sent out via a communication network, which has a smaller bandwidth compared with local transmission. Thus, the visual quality of the video is traded off for a smaller picture buffer and transmission rate.

It should be noted that although several steps of the method for compressing video data and several modules or sub-modules of the apparatus for compressing video data are described in the above description, this division is merely exemplary rather than mandatory. In fact, according to the embodiments of the present application, features and functions of two or more modules described above may be embodied in one module. Conversely, features and functions of one module described above can be further divided into a plurality of modules.

Those skilled in the art will be able to understand and implement other variations to the disclosed embodiments by studying the specification, the disclosure, the drawings and the appended claims. In the claims, the words "include" or "including" do not exclude other elements and steps, and the words "a" or "an" do not exclude the plural. In the practical application of the present application, one part may perform the functions of a plurality of technical features cited in the claims. Any reference numerals in the claims should not be construed as limiting the scope.

What is claimed is:

1. A method for compressing video data having one or more video pictures, wherein each of the one or more video pictures is divided into a plurality of compression units each having a pixel array, wherein the method comprises:
   A) determining a compression target for a picture buffer, the picture buffer being configured to buffer compressed video data picture by picture;
   B) calculating a unit buffer budget for each compression unit based on the compression target, a size of the pixel array of the compression unit and a bit depth of pixels of the pixel array;
   C) receiving the video data; and
   D) for a $k^{th}$ compression unit of each video picture of the video data, k being a positive integer:
      calculating a unit compression cost for the $k^{th}$ compression unit using a predetermined lossless compression algorithm, and an accumulated compression cost, wherein the accumulated compression cost is a total of the unit compression costs for compressing the $k^{th}$ compression unit and n compression units prior to the $k^{th}$ compression unit, and n being a positive integer smaller than k; and
      comparing the accumulated compression cost and an accumulated buffer budget for the $k^{th}$ compression unit, wherein the accumulated buffer budget is a total of the unit buffer budgets for compressing the $k^{th}$ compression unit and n compression units prior to the $k^{th}$ compression unit:
         compressing the $k^{th}$ compression unit using the predetermined lossless compression algorithm, if the accumulated compression cost does not exceed the accumulated buffer budget by a predefined value; or
         adjusting a quantization level of a predetermined lossy compression algorithm to maintain that the accumulated compression cost does not exceed the accumulated buffer budget by the predefined value, and compressing the $k^{th}$ compression unit using the predefined lossy compression algorithm with the adjusted quantization level, if the accumulated compression cost exceeds the accumulated buffer budget by the predefined value;
         wherein the predetermined lossy compression algorithm is a lossy compression algorithm configured with the quantization level, and the predefined value defines a threshold range by which the accumulated compression cost is allowed to exceed the accumulated buffer budget.

2. The method of claim 1, wherein the plurality of compression units of each video picture is arranged in a matrix, and the $k^{th}$ compression unit and the n compression units prior to the $k^{th}$ compression unit are in a same row of the matrix.

3. The method of claim 1, wherein compressing the $k^{th}$ compression unit using the predetermined lossless compression algorithm, if the accumulated compression cost does not exceed the accumulated buffer budget by a predefined value comprises:
adjusting the quantization level of the predetermined lossy compression algorithm when compressing the $k^{th}$ compression unit using the predetermined lossless compression algorithm, such that a first compression unit subsequent to the $k^{th}$ compression unit is compressed using the predetermined lossy compression algorithm with its quantization level having an initial value equal to the adjusted quantization level during the compressing of the $k^{th}$ compression unit.

4. The method of claim 1, wherein before comparing the accumulated compression cost and the accumulated buffer budget for the $k^{th}$ compression unit, the method further comprises:
comparing the unit buffer budget with a unit compression cost for compressing the $k^{th}$ compression unit using the predetermined lossless compression algorithm:
compressing the $k^{th}$ compression unit using the predetermined lossless compression algorithm, if the unit compression cost does not exceed the unit buffer budget; or
perform the step of comparing the accumulated compression cost and the accumulated buffer budget for the $k^{th}$ compression unit, if the unit compression cost exceeds the unit buffer budget.

5. The method of claim 4, wherein compressing the $k^{th}$ compression unit using the predetermined lossless compression algorithm, if the unit compression cost does not exceed the unit buffer budget comprising:
adjusting the quantization level of the predetermined lossy compression algorithm when compressing the $k^{th}$ compression unit using the predetermined lossless compression algorithm, such that a first compression unit subsequent to the $k^{th}$ compression unit is compressed using the predetermined lossy compression algorithm with its quantization level having an initial value equal to the adjusted quantization level during the compressing of the $k^{th}$ compression unit.

6. The method of claim 1, wherein adjusting the quantization level of the predetermined lossy compression algorithm comprises:
adjusting a value of the quantization level with a predetermined step.

7. The method of claim 1, wherein for the $k^{th}$ compression unit, during adjusting the quantization level of the predetermined lossy compression algorithm, the quantization level has an initial value equal to a value of the quantization level used for compressing a $(k-1)^{th}$ compression unit.

8. The method of claim 1, wherein each compression unit comprises a plurality of compression subunits, and each of the plurality of compression subunits is compressed with respective values of the quantization value.

9. The method of claim 1, wherein the picture buffer comprises a buffer margin associated with the accumulated buffer budget, the buffer margin is configured to buffer a portion of the $k^{th}$ compression unit beyond the accumulated buffer budget, and the predefined value is based on a size of the buffer margin.

10. The method of claim 9, wherein the size of the buffer margin is not smaller than a buffer space accumulatively occupied during adjusting the quantization level to a predetermined maximum value with the predetermined step, and
the step of adjusting the quantization level of the predetermined lossy compression algorithm to maintain that the accumulated compression cost does not exceed the accumulated buffer budget by the predefined value comprises:
adjusting the quantization level once from its initial value with the predetermined step, wherein the initial value is equal to a value of the quantization level used for compressing a $(k-1)^{th}$ compression unit.

11. The method of claim 1, wherein the predetermined value is zero.

12. The method of claim 11, wherein the step of adjusting the quantization level of the predetermined lossy compression algorithm to maintain that the accumulated compression cost does not exceed the accumulated buffer budget by the predefined value comprises:
adjusting the quantization level with the predetermined step at least once from its initial value till that the accumulated compression cost does not exceed the accumulated buffer budget.

13. The method of claim 1, wherein a luma component and a chroma component of the video data correspond to respective compression targets.

14. An apparatus for compressing video data having one or more video pictures, wherein each of the one or more video pictures is divided into a plurality of compression units each having a pixel array, wherein the apparatus comprises:
a processor;
an instruction storing medium configured to store instructions executable by the processor;
a picture buffer for buffering compressed video data picture by picture; wherein the processor is configured to perform the following steps:
A) determining a compression target for the picture buffer;
B) calculating a unit buffer budget for each compression unit based on the compression target, a size of the pixel array of the compression unit and a bit depth of pixels of the pixel array;
C) receiving the video data; and
D) for a $k^{th}$ compression unit of each video picture of the video data, k being a positive integer:
calculating a unit compression cost for the $k^{th}$ compression unit using a predetermined lossless compression algorithm, and an accumulated compression cost, wherein the accumulated compression cost is a total of the unit compression costs for compressing the $k^{th}$ compression unit and n compression units prior to the $k^{th}$ compression unit, and n being a positive integer smaller than k;
comparing the accumulated compression cost and an accumulated buffer budget for the $k^{th}$ compression unit, wherein the accumulated buffer budget is a total of the unit buffer budgets for compressing the $k^{th}$ compression unit and n compression units prior to the $k^{th}$ compression unit:

compressing the $k^{th}$ compression unit using the predetermined lossless compression algorithm, if the accumulated compression cost does not exceed the accumulated buffer budget by a predefined value; or adjusting a quantization level of a predetermined lossy compression algorithm to maintain that the accumulated compression cost does not exceed the accumulated buffer budget by the predefined value, and compressing the $k^{th}$ compression unit using the predefined lossy compression algorithm with the adjusted quantization level, if the accumulated compression cost exceeds the accumulated buffer budget by the predefined value; wherein the predetermined lossy compression algorithm is a lossy compression algorithm configured with the quantization level, and the predefined value defines a threshold range by which the accumulated compression cost is allowed to exceed the accumulated buffer budget; and sending the compressed $k^{th}$ compression unit to the picture buffer.

15. The apparatus of claim 14, wherein the plurality of compression units of each video picture is arranged in a matrix, and the $k^{th}$ compression unit and the n compression units prior to the $k^{th}$ compression unit are in a same row of the matrix.

16. The apparatus of claim 14, wherein compressing the $k^{th}$ compression unit using the predetermined lossless compression algorithm, if the accumulated compression cost does not exceed the accumulated buffer budget by a predefined value comprises:

adjusting the quantization level of the predetermined lossy compression algorithm when compressing the $k^{th}$ compression unit using the predetermined lossless compression algorithm, such that a first compression unit subsequent to the $k^{th}$ compression unit is compressed using the predetermined lossy compression algorithm with its quantization level having an initial value equal to the adjusted quantization level during the compressing of the $k^{th}$ compression unit.

17. The apparatus of claim 14, wherein the processor is further configured to perform:

before comparing the accumulated compression cost and the accumulated buffer budget for the $k^{th}$ compression unit:

comparing the unit buffer budget with a unit compression cost for compressing the $k^{th}$ compression unit using the predetermined lossless compression algorithm:

compressing the $k^{th}$ compression unit using the predetermined lossless compression algorithm, if the unit compression cost does not exceed the unit buffer budget; or perform the step of comparing the accumulated compression cost and the accumulated buffer budget for the $k^{th}$ compression unit, if the unit compression cost exceeds the unit buffer budget.

18. The apparatus of claim 17, wherein compressing the $k^{th}$ compression unit using the predetermined lossless compression algorithm, if the unit compression cost does not exceed the unit buffer budget comprising:

adjusting the quantization level of the predetermined lossy compression algorithm when compressing the $k^{th}$ compression unit using the predetermined lossless compression algorithm, such that a first compression unit subsequent to the $k^{th}$ compression unit is compressed using the predetermined lossy compression algorithm with its quantization level having an initial value equal to the adjusted quantization level during the compressing of the $k^{th}$ compression unit.

19. The apparatus of claim 14, wherein the processor is further configured to perform: adjusting the quantization level of the predetermined lossy compression algorithm by adjusting a value of the quantization level with a predetermined step.

20. The apparatus of claim 14, wherein for the $k^{th}$ compression unit, during adjusting the quantization level of the predetermined lossy compression algorithm, the quantization level has an initial value equal to a value of the quantization level used for compressing a $(k-1)^{th}$ compression unit.

21. The apparatus of claim 14, wherein each compression unit comprises a plurality of compression subunits, and each of the plurality of compression subunits is compressed with respective values of the quantization value.

22. The apparatus of claim 14, wherein a luma component and a chroma component of the video data correspond to respective compression targets.

23. The apparatus of claim 14, wherein the picture buffer is configured in an external memory.

24. The apparatus of claim 14, wherein the picture buffer comprises a buffer margin associated with the accumulated buffer budget, the buffer margin is configured to buffer a portion of the $k^{th}$ compression unit beyond the accumulated buffer budget, and the predefined value is based on a size of the buffer margin.

25. The apparatus of claim 24, wherein the size of the buffer margin is not smaller than a buffer space accumulatively occupied during adjusting the quantization level to a predetermined maximum value with the predetermined step, and the processor is further configured to perform:

adjusting the quantization level once from its initial value with the predetermined step, wherein the initial value is equal to a value of the quantization level used for compressing a $(k-1)^{th}$ compression unit.

26. The apparatus of claim 14, wherein the predetermined value is zero.

27. The method of claim 14, wherein the processor is further configured to perform:

adjusting the quantization level with the predetermined step at least once from its initial value till that the accumulated compression cost does not exceed the accumulated buffer budget.

* * * * *